US012686376B2

(12) United States Patent　　　　(10) Patent No.:　US 12,686,376 B2

Heid　　　　　　　　　　　　　　　(45) Date of Patent:　Jul. 21, 2026

(54) AIRCRAFT BRAKING INDICATORS

(71) Applicant: Hydro-Aire Aerospace Corporation, Burbank, CA (US)

(72) Inventor: Franklin Michael Heid, Santa Clarita, CA (US)

(73) Assignee: Hydro-Aire Aerospace Corporation, Burbank, CA (US)

( * ) Notice: Subject to any disclaimer, the term of this patent is extended or adjusted under 35 U.S.C. 154(b) by 551 days.

(21) Appl. No.: 18/092,835

(22) Filed: Jan. 3, 2023

(65) Prior Publication Data

US 2023/0211767 A1　　　Jul. 6, 2023

Related U.S. Application Data

(60) Provisional application No. 63/297,106, filed on Jan. 6, 2022.

(51) Int. Cl.
| | |
|---|---|
| *F16D 66/02* | (2006.01) |
| *B60T 17/22* | (2006.01) |
| *B64C 25/42* | (2006.01) |
| *F16D 66/00* | (2006.01) |

(52) U.S. Cl.
CPC ............ *B60T 17/22* (2013.01); *F16D 66/021* (2013.01); *B64C 25/42* (2013.01); *F16D 2066/001* (2013.01); *F16D 2066/003* (2013.01)

(58) Field of Classification Search
CPC ................... B60T 17/22; B60T 17/221; F16D 66/00–028; B64C 25/42; B64D 45/00
See application file for complete search history.

(56) References Cited

U.S. PATENT DOCUMENTS

| | | | |
|---|---|---|---|
| 4,520,661 A | 6/1985 | Tamai et al. | |
| 4,658,936 A | 4/1987 | Moseley | |
| 5,678,661 A | * 10/1997 | Kim ...................... | F16D 66/024 |
| | | | 188/1.11 E |
| 2009/0205910 A1 | 8/2009 | Cahill | |
| 2021/0229651 A1 | 7/2021 | Al-Tabakha | |

FOREIGN PATENT DOCUMENTS

| | | | |
|---|---|---|---|
| CN | 102288404 A | 12/2011 | |
| CN | 115614406 A | * 1/2023 | |
| EP | 3636949 A1 | 4/2020 | |

OTHER PUBLICATIONS

International Search Report and Written Opinion of the International Searching Authority dated Apr. 27, 2023, in connection with International Application No. PCT/US2023/010097, 8 pages.
Supplementary European Search Report dated Dec. 11, 2025, in connection with European Application No. 23737543.1, 8 pages.

* cited by examiner

*Primary Examiner* — David R Morris

(57) ABSTRACT

An indicator for monitoring temperature and wear of one or more aircraft brakes. One or more sensors are provided for sensing a parameter of usage, and an estimate of usage of the part can be determined based upon the signal indicating the sensed value of the parameter of usage of the aircraft part. A plurality of sensors can be provided for sensing usage of a plurality of parts of the aircraft, and the estimate of usage of the part can be stored for access of the estimate by ground personnel. In addition, the sensed usage data are critical inputs for the brake controller to regulate which brakes are applied.

8 Claims, 2 Drawing Sheets

AIRCRAFT BRAKING INDICATORS

CROSS-REFERENCES TO RELATED APPLICATIONS

This application claims priority to U.S. Provisional Application Nos. 63/297,106, filed Jan. 6, 2022, the content of which is incorporated by reference herein in its entirety.

BACKGROUND

The present invention pertains to the art of aircraft brake temperature and aircraft brake stack wear, and more particularly to sensors for use in connection with carbon-carbon composite friction discs (brake stack).

Friction braking is provided on commercial aircraft to aid the deceleration of the aircraft upon landing. Today's aircraft brakes include a brake stack that uses a combination of alternating rotor discs and stator discs. The rotor discs engage with a landing gear wheel and rotate with the wheel, while the stator discs engage with a fixed torque tube and thus are stationary relative to the wheel. When the aircraft is rolling and the brake stack is compressed by, for example, a hydraulically actuated piston or electrical actuator, the mating surfaces of the brake stack (rotors and stators) cooperate to generate a braking force that is accompanied by a large quantity of heat energy.

Current sensor designs measure a landing gear brake temperature by measuring the temperature of the torque tube and using this measured temperature to then approximate the temperature in the brake stack. This indirect method of measuring brake temperature has its drawbacks, one of which is a slow response time to indicate the actual brake stack temperature. During a typical aircraft landing, peak brake stack temperature can exceed 400° C. while the torque tube temperature can be well below that of the actual brake stack temperature. The time it takes for the heat to transfer from the stack to the torque tube and then into the temperature sensor lags actual brake stack temperature by as much as ten to thirty minutes. Thus, the indicated temperature to the pilot may be significantly lower than the actual brake stack temperature. After 60 minutes the indicated temperature of a parked aircraft could still measure less than the actual brake stack temperature. The buildup of brake stack temperature also occurs at critical times, such as when taxiing out to take-off. Here, too, the indicated brake temperature will lag actual brake temperature.

Carbon brakes are becoming the standard for commercial aircraft over steel brakes. However, steel brakes and carbon brakes have substantially different temperature ranges, and wear patterns. Most wear in steel brakes occur at higher temperatures typically seen during landing, and the least wear occurs during taxiing. In contrast, carbon brakes wear the least during landing, and the highest wear during taxiing.

It is important for aircraft safety that the brake stack wear and temperature are measured accurately before roll-out from the terminal and before take-off. A critical criteria and the limiting factor for an aircraft's take-off analysis is often brake stack temperature. The brake stack temperature is crucial in the event the aircraft must perform full Rejected Take-Off (RTO). However, current methods to monitor temperature and wear of a brake stack do not provide sufficient information on brake system status in real time. Additionally, several disadvantages to visual inspection exist, including accuracy and the timing of inspection. Thus, it is desirable to improve the accuracy and timing of such measurements. Rather than using an indicated temperature that has latency to determine take-off conditions, a more responsive temperature indicator is needed to accurately and continuously measure actual brake stack temperature. Brake stack temperature is also influenced by brake wear. Having a combined electronic displacement sensor with a temperature sensor that provides real time brake stack temperature and wear data improves the pilot's awareness and provides important data on maintenance and adaptive braking systems.

SUMMARY OF THE INVENTION

In various embodiments, the present invention provides a brake stack indicator to continuously monitor brake wear and brake stack temperature. In a presently preferred embodiment, the indicator may comprise at least one probe, a displacement sensor, and a temperature sensor. The probe is coupled to the both the brake housing and pressure plate, and travels axially when the brake stack is compressed or released, which allows the displacement sensor to measure the relative distance traveled by the probe. Concurrently, the temperature sensor measures and transmits the temperature of a disc within the brake stack. This combination temperature/displacement indicator is capable of operating in extremely harsh environments including elevated temperatures, vibration, shock and corrosive environmental conditions.

The displacement indicator preferably comprises a rod that couples to a pressure plate or heat shield at one end and engages the brake housing on the other end. In various embodiments, the axial position of the rod determines the relative position of the pressure plate and, across a history of movements, the current wear condition of a brake stack. In various embodiments, the axial position of the rod is measured by a linear resistive potentiometer or linear variable differential transducer. The temperature sensor consists of a rod within the displacement sensor rod and measures brake stack temperature from direct contact with the brake stack disc. In various embodiments, the temperature sensor is mounted separate from the displacement sensor.

The indicator provides accurate real-time data for improving pilot braking techniques, calculating turn-around-time, and for determining when brakes are within take-off parameters. In one embodiment, the indicator at the end of the temperature probe has a captured ball, like a ball point pen, to roll on a surface. In another embodiment of the indicator, the end of the temperature probe is formed with a sled-like structure that is configured to slide on the surface. In some embodiments, the real-time electronic feedback indicator can replace the wear pin on existing brakes, yet still providing the visual and manual method to check wear pins per existing processes and procedures.

These and other features of the invention will best be understood in light of the detailed description of the invention below along with the accompanying drawings.

DETAILED DESCRIPTION OF THE PREFERRED EMBODIMENTS

The detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that logical, electrical, and mechanical changes may be made without departing from the spirit and scope of the disclosure. Thus, the detailed description herein is presented for purposes of illustration only and not of limitation.

Figure 1:
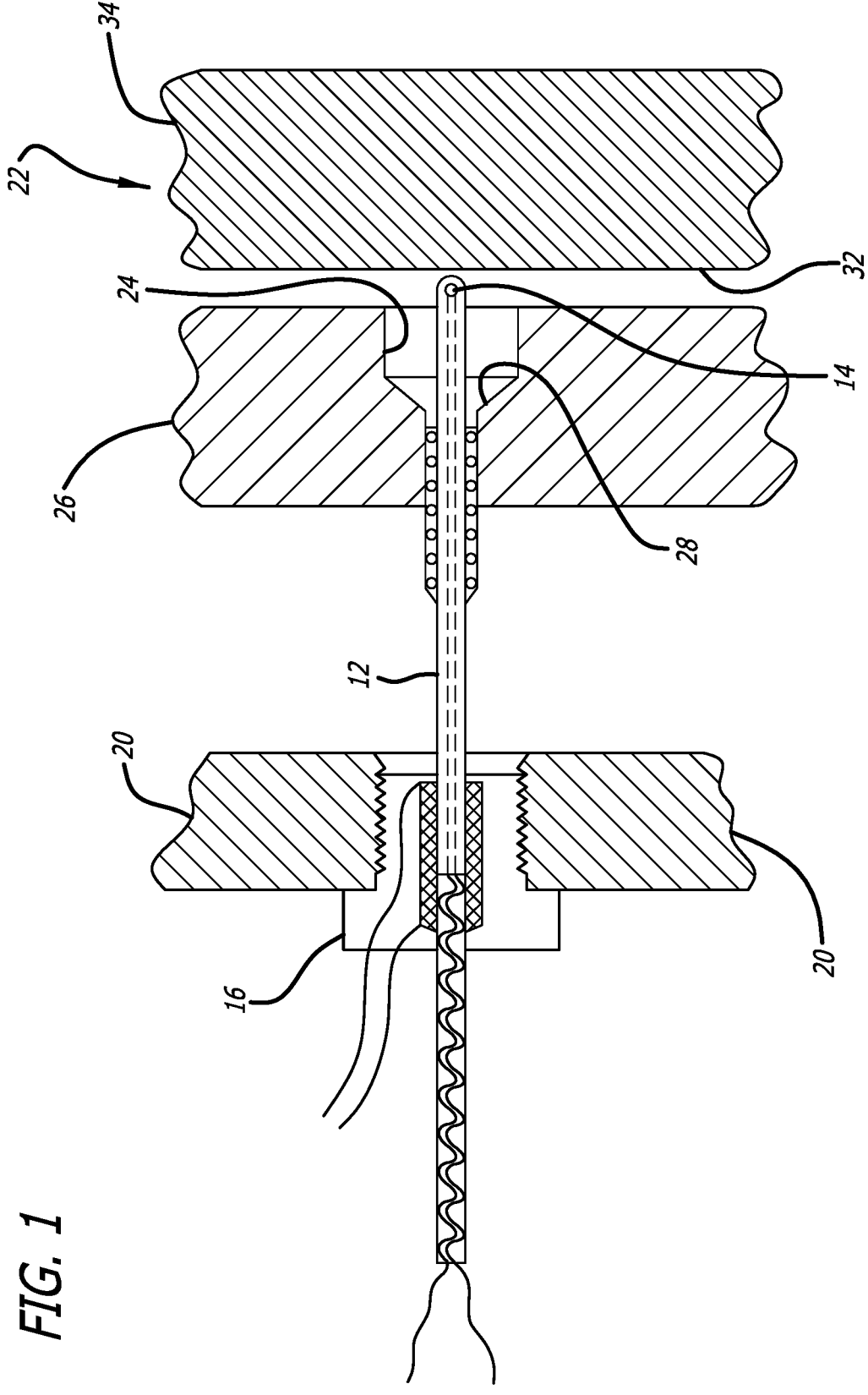
FIG. 1 illustrates a cross section view of a portion of a brake assembly in accordance with various embodiments.

In the presently preferred embodiment illustrated in FIG. 1, the aircraft part for which temperature and wear is to be monitored is an aircraft brake assembly, typically consisting of a brake housing and brake stack and torque tube such as that disclosed in U.S. Pat. No. 4,658,936, the content of which is incorporated herein by reference. The brake housing comprises pistons, actuation means and a brake indicator with temperature and displacement sensors. The brake stack is the wearable material consisting of alternating rotor discs and stator discs, with the outer most discs of the brake stack being the pressure plate proximal to the brake housing and backing plate distal to the brake housing. The rotor disc members keyed to the inner diameter of a wheel (not shown) and the stator disc members keyed to the stationary torque tube member of the brake housing. When brakes are applied the pistons within the brake housing applies pressure to the pressure plate, compressing the rotor and stator disc members together, generating friction and heat, and thus decelerating the wheel.

The brake indicator of FIG. 1 consists of a probe 12, temperature sensor 14 and displacement sensor 16. The displacement sensor 16 mounts to an axial bore through the brake housing 20 midway between the inner and outer diameter of the brake stack 22. A flange end 24 of the probe 12 is affixed to the pressure plate 26 through an axial bore 28 in the pressure plate 26 with the rest of the probe 12 free to travel axially within the displacement sensor 16. The signals generated by the displacement sensor 16 based on the position of the probe 12 indicates the relative degree of wear of the brake stack 22 when the brake is actuated and the pistons compress the brake stack 22 away from the brake housing 20.

Unlike prior temperature sensors, however, here the temperature sensor 14 under bias extends from the flange end 24 of the probe 12 making direct thermal contact with the friction surface 32 of the rotor disc 34, whereby the temperature developed on the friction surface 32 is thermally transmitted directly to the temperature sensor 14. The signals generated by the temperature sensor 14 are then transmitted for indication and/or processing. The tip of the temperature sensor 14 is constructed of a thermally conductive material resistant to abrasion and thermally isolated from the probe 12.

Figure 2:
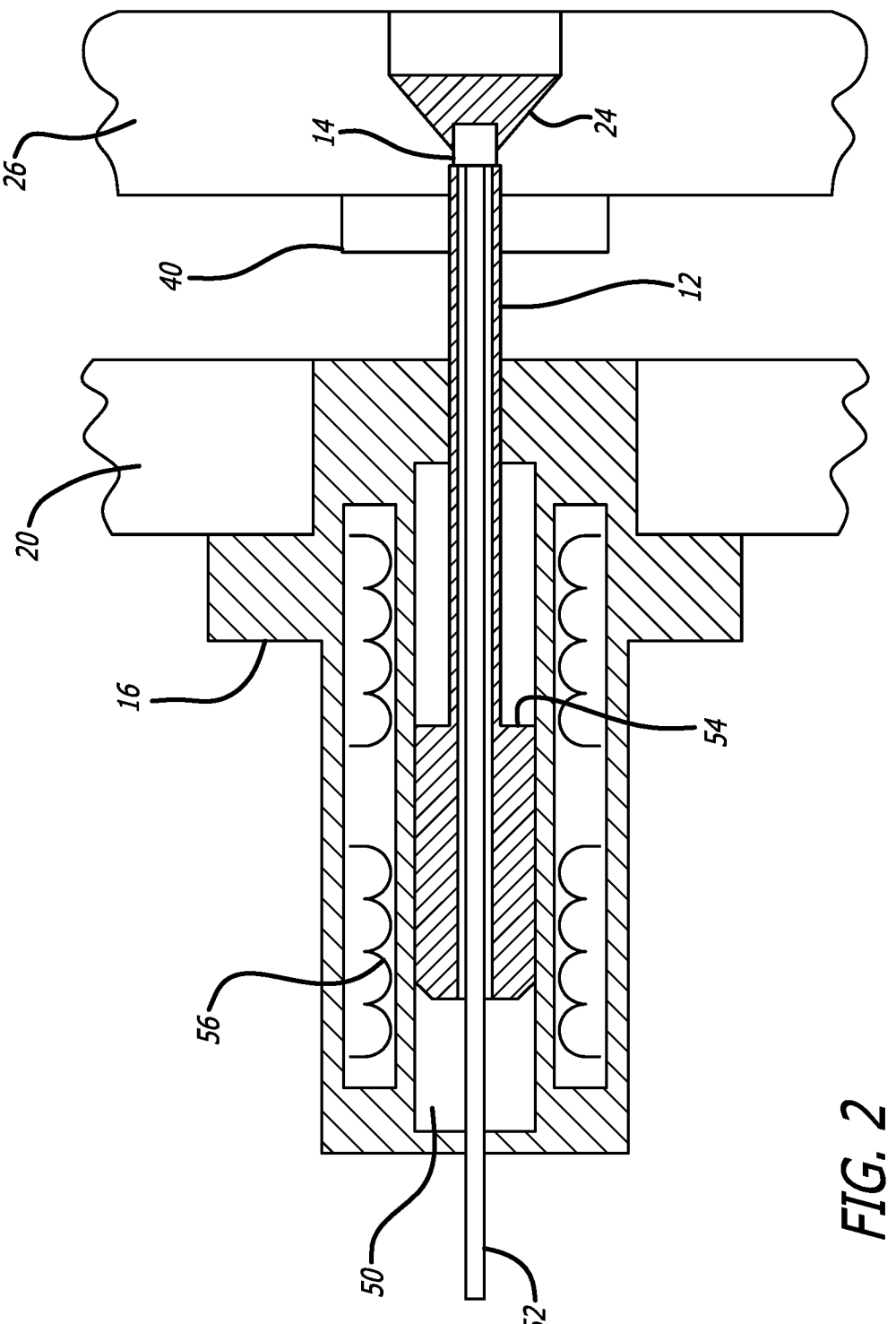
FIG. 2 illustrates a cross sectional view of a second embodiment of the indicator.

In FIG. 2, an alternate embodiment is disclosed wherein the probe 12 that is mounted in the pressure plate 26 as was the case in FIG. 1, but the temperature sensor 14 is embedded inside the flanged end 24 of the probe 12. A snap ring 40 or other retaining device locks the probe 12 on the pressure plate 26, ensuring the temperature sensor 14 is proximate the brake stack. The displacement sensor 16 includes a central bore 50 through which the probe 12 slides, and the thermocouple's electrical leads 52 extend out the displacement sensor 16. The end of the probe 12 includes an annular iron core 54 and surrounding the central bore 50 is an electrical coil 56 that can be used to detect the movement of the iron core 54. Changes in the current in the electrical coil 56 caused by the movement of the iron core 54 can be detected and used to automatically evaluate the position of the end of the probe 12, and thus the wear on the brake stack 22.

While certain embodiments have been described and depicted to help explain the present invention, it is understood that the invention is not strictly limited to those embodiments described and depicted. Rather, a person of ordinary skill in the art will readily recognize certain modifications, substitutions, and alterations to the depicted and described components, and the scope of the invention is intended to include all such modifications, substitutions, and alterations.

I claim:

1. An aircraft brake indicator, comprising:
   a movable probe in contact with a stationary member of an aircraft brake housing;
   a temperature sensor slidably fitted in an end of said probe and biased to extend from the probe end into direct contact with a friction surface of a rotor disc of the aircraft brake stack; and
   a displacement sensor coupled with said moveable probe for monitoring a displacement of the aircraft brake stack and generating signals indicating a relative degree of wear of the aircraft brake stack.

2. The aircraft brake indicator of claim 1, wherein the stationary member is the aircraft brake housing.

3. The aircraft brake indicator of claim 1, wherein said movable probe further comprises:
   an axially elongated body having first and second ends, said first end releasably engaged to a pressure plate, and said second end extending through said displacement sensor for reciprocal movement therein; and
   said displacement sensor engaged through an axial bore in the brake housing.

4. The aircraft brake indicator of claim 1, wherein said displacement sensor measures wear when the said moveable probe moves by a relative distance between said brake housing and a pressure plate when brake assembly is pressurized.

5. The aircraft brake indicator of claim 1, wherein said moveable probe is biased to extend an end of said temperature sensor into contact with a rotor disc surface.

6. The aircraft brake indicator of claim 5, further comprising a spring to bias the moveable probe.

7. The aircraft brake indicator of claim 5, wherein said temperature sensor end has a captured ball configured to roll on the surface of the rotor disc.

8. The aircraft brake indicator of claim 1, wherein said movable probe is less thermally conductive than said temperature sensor.

* * * * *